United States Patent
Zerenner et al.

(10) Patent No.: US 8,200,569 B1
(45) Date of Patent: Jun. 12, 2012

(54) OPTION SEARCH CRITERIA TESTING

(75) Inventors: Ernest H. Zerenner, Wilmington, DE (US); Gregory James Zerenner, Newark, DE (US); Michael L. Chupka, Newark, DE (US)

(73) Assignee: Power Financial Group, Inc., Wilmington, DE (US)

( * ) Notice: Subject to any disclaimer, the term of this patent is extended or adjusted under 35 U.S.C. 154(b) by 583 days.

(21) Appl. No.: 11/820,952

(22) Filed: Jun. 21, 2007

Related U.S. Application Data

(60) Provisional application No. 60/815,966, filed on Jun. 22, 2006.

(51) Int. Cl.
*G06Q 40/00* (2012.01)

(52) U.S. Cl. ............................................. 705/37; 705/35

(58) Field of Classification Search ..................... 705/35, 705/37
See application file for complete search history.

(56) References Cited

U.S. PATENT DOCUMENTS

| | | | | |
|---|---|---|---|---|
| 4,209,845 A | 6/1980 | Berger et al. | ................. | 364/900 |
| 4,334,270 A | 6/1982 | Towers | ......................... | 364/300 |
| 4,566,066 A | 1/1986 | Towers | | |
| 4,611,280 A | 9/1986 | Linderman | ................... | 364/300 |
| 4,648,037 A | 3/1987 | Valentino | | |
| 4,674,044 A | 6/1987 | Kalmus et al. | ............... | 364/408 |
| 4,774,666 A | 9/1988 | Miyao et al. | .................. | 364/419 |
| 4,823,265 A | 4/1989 | Nelson | ........................... | 364/408 |
| 4,846,687 A | 7/1989 | White et al. | .................. | 434/112 |
| 4,870,610 A | 9/1989 | Belfer | ........................... | 364/900 |
| 4,878,843 A | 11/1989 | Kuch | ........................... | 434/112 |
| 4,961,139 A | 10/1990 | Hong et al. | | |
| 4,989,141 A | 1/1991 | Lyons et al. | | |
| 5,101,353 A | 3/1992 | Lupien et al. | | |
| 5,161,103 A | 11/1992 | Kosaka et al. | | |
| 5,169,342 A | 12/1992 | Steele et al. | .................. | 434/112 |
| 5,189,056 A | 2/1993 | Orlando et al. | | |
| 5,193,056 A | 3/1993 | Boes | | |
| 5,218,700 A | 6/1993 | Beechick | ................... | 395/259.2 |
| 5,220,500 A | 6/1993 | Baird et al. | | |
| 5,247,575 A | 9/1993 | Sprague et al. | | |
| 5,257,938 A | 11/1993 | Tien | .............................. | 434/128 |
| 5,260,999 A | 11/1993 | Wyman | ............................. | 384/4 |
| 5,262,942 A | 11/1993 | Earle | ............................. | 364/408 |
| 5,270,922 A | 12/1993 | Higgins | ........................ | 364/408 |

(Continued)

FOREIGN PATENT DOCUMENTS

GB 2161003 1/1986

(Continued)

OTHER PUBLICATIONS

PowerOptions, First in WEB based interactive options search engines, http://www.poweropt.com, 2001, 1 page.

(Continued)

*Primary Examiner* — Jagdish Patel
(74) *Attorney, Agent, or Firm* — Woodcock Washburn LLP

(57) ABSTRACT

A system for testing option search strategies comprises a repository of historical option data reflecting financial market conditions on a plurality of days in the past. The system is adapted to receive user defined search criteria for searching the repository of historical option data for option investments, search the repository of historical option data for option investments satisfying the user defined search criteria, and transmit the results. The system is further adapted to receive a request to use the user defined search criteria to search current financial market data for existing investment opportunities.

29 Claims, 11 Drawing Sheets

U.S. PATENT DOCUMENTS

| | | | |
|---|---|---|---|
| 5,297,031 A | 3/1994 | Gutterman et al. | 364/408 |
| 5,297,032 A | 3/1994 | Trojan et al. | |
| 5,302,132 A | 4/1994 | Corder | 434/156 |
| 5,347,452 A | 9/1994 | Bay, Jr. | 364/408 |
| 5,349,368 A | 9/1994 | Takeda et al. | 345/115 |
| 5,414,838 A * | 5/1995 | Kolton et al. | 705/36 R |
| 5,497,317 A | 3/1996 | Hawkins et al. | |
| 5,502,637 A | 3/1996 | Beaulieu et al. | |
| 5,537,618 A | 7/1996 | Boulton et al. | 395/161 |
| 5,544,281 A | 8/1996 | Maruoka et al. | 395/68 |
| 5,590,325 A | 12/1996 | Kolton et al. | |
| 5,594,910 A | 1/1997 | Filepp et al. | |
| 5,630,123 A | 5/1997 | Hogge | 395/607 |
| 5,644,727 A | 7/1997 | Atkins | |
| 5,675,746 A | 10/1997 | Marshall | |
| 5,741,136 A | 4/1998 | Kirksey et al. | 434/169 |
| 5,749,077 A | 5/1998 | Campbell | |
| 5,754,939 A | 5/1998 | Herz et al. | 455/4.2 |
| 5,761,661 A | 6/1998 | Coussens et al. | 707/9 |
| 5,784,696 A | 7/1998 | Melnikoff | 705/36 |
| 5,809,483 A | 9/1998 | Broka et al. | 705/37 |
| 5,854,997 A | 12/1998 | Sukeda et al. | 704/3 |
| 5,862,223 A | 1/1999 | Walker et al. | 380/25 |
| 5,862,325 A | 1/1999 | Reed et al. | 395/200.31 |
| 5,864,871 A | 1/1999 | Kitain et al. | 707/104 |
| 5,893,079 A | 4/1999 | Cwenar | |
| 5,911,136 A | 6/1999 | Atkins | 705/36 |
| 5,913,202 A | 6/1999 | Motoyama | 705/35 |
| 5,918,217 A | 6/1999 | Maggioncalda et al. | 705/36 |
| 5,978,778 A | 11/1999 | O'Shaughnessy | 705/36 |
| 6,012,042 A | 1/2000 | Black et al. | 705/36 |
| 6,021,397 A | 2/2000 | Jones et al. | 705/36 |
| 6,049,783 A | 4/2000 | Segal et al. | 705/37 |
| 6,058,378 A | 5/2000 | Clark et al. | 705/37 |
| 6,064,985 A | 5/2000 | Anderson | |
| 6,078,924 A | 6/2000 | Ainsbury et al. | |
| 6,226,623 B1 | 5/2001 | Schein et al. | |
| 6,317,726 B1 | 11/2001 | O'Shaughnessy | 705/36 |
| 6,321,212 B1 | 11/2001 | Lange | 705/37 |
| 6,839,686 B1 | 1/2005 | Galant | |
| 7,024,384 B2 | 4/2006 | Daughtery, III | |
| 7,165,042 B1 | 1/2007 | Segal et al. | 705/36 |
| 7,212,997 B1 | 5/2007 | Pine et al | 705/36 |
| 2001/0056392 A1 | 12/2001 | Daugherty, III | 705/36 |
| 2002/0128955 A1 | 9/2002 | Brady et al. | |
| 2002/0138390 A1 | 9/2002 | May | |
| 2002/0174056 A1 | 11/2002 | Sefein et al. | |
| 2003/0023536 A1 | 1/2003 | Hollerman et al. | |
| 2003/0028468 A1 | 2/2003 | Wong et al. | |
| 2003/0033240 A1 | 2/2003 | Balson et al. | |
| 2003/0069821 A1 | 4/2003 | Williams | |
| 2003/0069826 A1 | 4/2003 | Guidi et al. | |
| 2003/0101125 A1 | 5/2003 | McGill et al. | |
| 2003/0139993 A1 | 7/2003 | Feuerverger | |
| 2004/0068457 A1 | 4/2004 | Tao et al. | |
| 2004/0267657 A1 | 12/2004 | Hecht | |
| 2005/0015449 A1 | 1/2005 | Klos et al. | |
| 2005/0075962 A1 | 4/2005 | Dunne | |
| 2005/0108148 A1 | 5/2005 | Carlson | |
| 2005/0131796 A1 | 6/2005 | Bridges et al. | |
| 2005/0216390 A1 | 9/2005 | Snider et al. | |
| 2005/0228735 A1 | 10/2005 | Duquette | |
| 2006/0020526 A1 | 1/2006 | Viner | |
| 2006/0080193 A1 | 4/2006 | McMurtay et al. | |
| 2006/0259417 A1 | 11/2006 | Marynowski et al. | |
| 2007/0244788 A1* | 10/2007 | Ferris | 705/36 R |

FOREIGN PATENT DOCUMENTS

| | | |
|---|---|---|
| GB | 2210714 | 6/1989 |
| WO | WO 97/42591 | 11/1997 |
| WO | WO 98/09229 | 3/1998 |

OTHER PUBLICATIONS

OptionFind.com, www.optionfind.com, © 1998 Productivity Systems, 3 pages.

OptionsNewsletter: Stock Options made Easy, http://www.optionsnewsletter.com, © QuoteMedia, 18 pages.

E*Trade-research from Investors, www.etrade.com, © 1997 E*Trade Securities, 7 pages.

INVESTools-Trusted Advice for Independent Investors, www.investools.com, © 2000, 4 pages.

Yahoo!Finance, www.yahoo.com, © 2000, 2 pages.

Hoovers Online, The Business Network, www.hoovers.com, 2000, 1 page.

Covered Call Screening www.investorsmind.com, © 1996-2000 Investorsmind.com, 2 pages.

OptionsXpress-Option Screener, www.optionsxpress.com, ® 2000, 1 page.

Merrill Lynch—www.newmlol.com, © 2001,15 pages.

Your Finance Resource, www.investmentdiscovery.com, 2006, 2 pages.

www.optionsearcher.com, © 2001-2006 OptionSearcher.com, 5 pages.

Optionetics.com: An Investment Education Resource for Stock and Options Traders, www.optionetics.com, © 1995-2006, 19 pages.

OptionMonitor, Your Source for Covered Call Option Data and Analysis, www.optionmonitor.com, © 2001-2006 Option Review, Inc., 10 pages.

www.msn.com, Home page, 2006 © Microsoft, 13 pages.

Financial Planning and Small Business Software for Individuals—Official Quicken Site, http://quicken.intuit.com, © 2006 Intuit, Inc., 10 pages.

Carey, T.W., "Calls of the Mild", *Barron's Technology Week*, Apr. 29, 2002, 1 page.

OptionFind.com, www.optionfind.com, Feb. 24, 2000, 6 pages.

OptionsXpress-Option Screener, www.optionsxpress.com, Oct. 3, 2005, 4 pages.

PowerOptions Plus.Com, The Best Way to Find, Compare, Analyze, and make Money on Option Investments, www.poweropt.com, © 1997-2002, 1 page.

AIQ Systems, The World Leader in Intelligent Trading Software, http://www.aiqsystems.com, Home page, 3 pages.

U.S. Appl. No. 11/611,043, filed Aug. 1997, Segal, G.

U.S. Appl. No. 09/676,374, filed Sep. 2000, Zerenner, E.

U.S. Appl. No. 10/607,418, filed Jun. 2002, Zerenner, E.

U.S. Appl. No. 11/243,216, filed Oct. 2005, Zerenner, E.

Evan, Thomas., Power Options Plus, Futures, Feb. 2002, 31, 3, 56-57.

In the United States Patent and Trademark Office, in re.: U.S. Appl. No. 09/696,374, filed Sep. 29, 2000, Final Office Action dated Nov. 22, 2005, 5 pages.

In the United States Patent and Trademark Office, in re.: U.S. Appl. No. 09/676,374, filed Sep. 29, 2000, Non-Final Office Action dated Dec. 1, 2004, 16 pages.

In the United States Patent and Trademark Office, in re.: U.S. Appl. No. 09/676,374, filed Sep. 29, 2000, Non-Final Office Action dated Jan. 16, 2007, 4 pages.

In the United States Patent and Trademark Office, in re.: U.S. Appl. No. 09/676,374, filed Sep. 29, 2000, Non-Final Office Action dated Jul. 5, 2007, 4 pages.

In the United States Patent and Trademark Office, in re.: U.S. Appl. No. 09/676,374, filed Sep. 29, 2000, Non-Final Office Action dated May 26, 2009, 5 pages.

In the United States Patent and Trademark Office, in re.: U.S. Appl. No. 10/607,418, filed Jun. 26, 2003, Non-Final Office Action dated Dec. 27, 2007, 11 pages.

In the United States Patent and Trademark Office, in re.: U.S. Appl. No. 10/607,418, filed Jun. 26, 2003, Non-Final Office Action dated Jul. 20, 2009, 23 pages.

In the United States Patent and Trademark Office, in re.: U.S. Appl. No. 10/607,418, filed Jun. 26, 2003, Non-Final Office Action dated Jun. 6, 2008, 20 pages.

In the United States Patent and Trademark Office, in re.: U.S. Appl. No. 10/607,418, filed Jun. 26, 2003, Non-Final Office Action dated May 16, 2007, 11 pages.

In the United States Patent and Trademark Office, in re.: U.S. Appl. No. 11/243,216, filed Oct. 4, 2005, Non-Final Office Action dated Mar. 11, 2008, 23 pages.

In the United States Patent and Trademark Office, in re.: U.S. Appl. No. 11/611,043, filed Dec. 14, 2006, Non-Final Office Action dated Feb. 4, 2009, 6 pages.

In the United States Patent and Trademark Office, in re.: U.S. Appl. No. 10/607,418, filed Jun. 26, 2003, Final Office Action dated Nov. 24, 2008, 19 pages.
www.poweropt.com, PowerOptions, Oct. 12, 1999 and Jun. 6, 2002, web.archive.org (Wayback Machine), pp. 1-9.
"Data Broadcasting Corporation Unveils Multiple-User Real-Time Stock Market Investment Tool", PR Newswire, Apr. 8, 1997, 2 pages.
"Equity Research/Portfolio Analytics Support", Wall Street & Technology, (no month available) 1993, 136, Abstract.
"Faster Access to Newly Released Research via Investext", Information Today, Mar. 1993, 5(1).
"First Call Notes to be Available on Fidelity's MAXXESS & MAXXnet", Business Wire, Jun. 1997, 2 pages.
"Hoover's, Inc. Introduces StockScreener Free World Wide Web Service for Investors", Information Today, Sep. 1997, 45(1).
"IBM InfoSage Web-Based Service Debuts", Information Today, (no month available) 1996, 3 pages.
"On the Street Online, New & Noteworthy", Jan. 1996, 28-30.
"R.R. Donnelley Financial and IPO Crossroads Launch Highly Searchable IPO Database Website", PR Newswire, Dec. 1996, 1204, 4 pages.
Telescan Inc. (Stock analysis Software) (1995 Guide to Computerized Trading), Futures (Cedar Falls, Iowa), Jul. 1995, 3 pages.
"Telescan launches Internet's First Complete Real-Time Information and Analysis Service for the Financial Markets", PR Newswire, Apr. 5, 1995, 3 pages.
"Telescan, Inc. Launches Internet's First Complete Real-Time Information and Analysis Service for the Financial Markets", PR Newswire, Apr. 1995, 405NY036.
"Telescan, Inc. Launches ProSearch 5.0: Fast Stock Screening Software Program Targets All Investors", Business Wire, Jun. 1996, 6060617.
"Telescan, Inc. launches ProSearch 5.0: Fast Stock Screening Software Program Targets All Investors", Business Wire, Jun. 6, 1996, 3 pages.
"Telescan, Inc.", Futures, Jul. 1995, 46.
"ZDNet Introduces Inter@active Investor, Web's Most Comprehensive Source of Financial News and Information on Tech Companies", PR Newswire, Feb. 1998, 202.
Armstrong, "Navigate the Networks Like a Wall Street Pro", Business Week, Oct. 2004, 224, Abstract.
Barboza, "Reading the Tea Leaves Via Stock Analysis Software", New York Times, Sep. 21, 1997, 2 pages.
Carey, "Fidelity On-Line Express", PC Magazine, Jan. 1995, 14(1), 204(1), Abstract.
Cronin, "Is Giving Away Data a Smart Way to Profit?", Fortune, Dec. 1997, 258, Abstract.
Cullen, "Investing the High Tech Way (On-Line Products for Investors)", High Technology, Jun. 1987, 68, Abstract.
Dreyfuss, "How to Invest with Your PC", Fortune, Oct. 1990, 211(3).
Foust, "Screening Stocks on Your PC Screen", Business Week, Oct. 1993, 142(2), Abstract.
Gianturco, "Investment Software: Broker in a Box", Forbes, Inc., Apr. 8, 1996, 157(7), S82(1) 3 pages.

Gianturco, "Using Your PC to Pick the Best Fund Finder. (Steele Systems' Mutual Fund expert, Telescan's Mutual Fund Search, Value Line Publishing's Value Line Fund Analyzer and Morningstar's Ascent, Principia and Principia Plus fund-picking programs) (Forbes ASAP) (Software Review) (Evaluation)", Forbes, Oct. 1996, S41, 5 pages.
Gold, "Profile Increases Range of Online Service", Newsbytes, Jun. 1990.
Grinder, "An Overview of Financial Services Resources on the Internet", Financial Services Review, (no month available) 1997, 6(2), 125-140.
http://web.archive.org/web/19991110210901/telescan.com/telescan_prod_prolerts.htm, Telescan, ProSearch Alerts, Accessed May 5, 2010.
http://web.archive.org/web/20000309144734/telescan.com/telescan_prod_procrit.htm, Telescan, ProSearch Alerts, Accessed May 5, 2010.
Kan, "Street Smart 1.0", MacWorld, Feb. 1995, 59, Abstract.
Kawamoto, "On the Street . . . Online", New & Noteworthy, Jan. 1996, 2 pages.
Moad, "Sabre Rattled", PC Week Executive, Jan. 29, 1996, E1-E2.
Ojala, "The Dollar Sign", http://www.onlineinc.com/database, Aug./Sep. 1996, Database, 82-88.
Price-Evans, "Investment Software: Plotting a Course on Supercharts", Investors Chronicle, Feb. 3, 1995.
Retkwa, "Financial Pages: You Can Now Obtain Investment Intelligence That Rivals That of Professional Traders", Internetworld, Feb. 1996, 66(6), Abstract.
Rosen, "Fitting the Plan to the Person", The New York Times, Nov. 16, 1986, Section 12, p. 40, col. 1.
Sahgal, "OLTP Spells Success in Time-Pressed '90s", Wall Street Computer Review, Jan. 1990, S42, Abstract.
Stern, "Trade in Your Old Way of Investing: With These Electronic Tools You Can Bring the Hottest Market Data Home Quickly", Home Office Computing, Jul. 1993, 62, Abstract.
U.S. Appl. No. 09/676,374, Notice of Allowance Dated Feb. 18, 2010, 7 pages.
U.S. Appl. No. 10/607,418, Notice of Allowance dated Feb. 5, 2010, 14 pages.
U.S. Appl. No. 11/611,043, Final Rejection dated Nov. 24, 2009, 7 pages.
Weiner, "Software Packages for Investors", Fortune, (no month available) 1986, 114, 185(3).
Yakal, "Personal Investment Software, Investment 101", PC Magazine, Nov. 19, 1996, 15(20), 341(9), 9 pages.
Boczar, "An Introduction to options and other financial derivative strategies", Trusts & Estates, Feb. 1997, vol. 136, Issue 3, p. 43, 20 pages.
Poweropt.com, "PowerOptionsPlus—Tool Menu, Easy Startup Guide, Registration Page", http://www.poweropt.com/toolmenu.asp, http://www.poweropt.com/startupguide.asp, http://www.poweropt.com/pricing.asp, accessed Dec. 13, 2011, 7 pages.
U.S. Appl. No. 12/823,203: Non-Final Rejection dated Jan. 5, 2012, 40 pages.

* cited by examiner

Introduction

This is a group analysis of your back testing scan. The maximum number of candidates in this group analysis is 20. The analysis shown is for the Covered Call strategy. It was assumed that an equal dollar amount was invested in each position. The results are ordered from highest % Return to lowest over the time period specified.

% Dnsd Prot = Option Bid / Stock Price
Net Debit = Stock Price - Option Bid
Net Value = Last Stock Price - Last Option Ask
% Return = (Net Value - Net Debit) / Net Debit

*Expiration Date ☐ Expired

Results for covered calls scan on April 27, 2006 ending 6/16/2006 with a back-testing... 11:14:0  Custom End Date

| More Info | | Co. Name | Stock Sym | Stock Price | Strike Mo. | Opt Sym | Opt Bid | Net Debit | % Dnsd Prot | % If Assnd | End Date | Stock Price | Opt Ask | % In Money | Net Value | % Return |
|---|---|---|---|---|---|---|---|---|---|---|---|---|---|---|---|---|
| ▶ | ☐ | Interdigital Comm. Corp. | IDCC | 27.01 | 06 JUN 30 | DAQFF | 0.95 | 26.06 | 3.5 | 15.1 | 6/16/2006 | 32.29 | 2.40 | 7.1 | 30.00 | 15.1 |
| ▶ | ☐ | Ezcorp Inc. | EZPW | 30.24 | 06 JUN 35 | ULPFG | 1.00 | 29.24 | 3.3 | 19.7 | 6/16/2006 | 30.55 | 0.00 | -14.6 | 30.55 | 4.5 |
| ▶ | ☐ | Healtheon/WebMD Corp. | HLTH | 11.51 | 06 JUN 12.5 | HUTFV | 0.45 | 11.06 | 3.9 | 13.0 | 6/16/2006 | 11.31 | 0.00 | -10.5 | 11.31 | 2.3 |
| ▶ | ☐ | Chaparral Steel Co. | CHAP | 60.00 | 06 JUN 65 | ZHQFM | 2.80 | 57.20 | 4.7 | 13.6 | 6/16/2006 | 58.41 | 0.00 | -11.3 | 58.41 | 2.1 |
| ▶ | ☐ | Compania de Minas Buenaventura SA | BVN | 27.57 | 06 JUN 30 | BVNFF | 1.05 | 26.52 | 3.8 | 13.1 | 6/16/2006 | 26.12 | 0.00 | -14.9 | 26.12 | -1.5 |
| ▶ | ☐ | Coldwater Creek Inc. | CWTR | 27.48 | 06 JUN 30 | UCJFF | 0.85 | 26.63 | 3.1 | 12.7 | 6/16/2006 | 25.23 | 0.00 | -18.9 | 25.23 | -5.3 |
| ▶ | ☐ | Pioneer Drilling Co. | PDC | 16.12 | 06 JUN 17.5 | PDCFW | 0.55 | 15.57 | 3.4 | 12.4 | 6/16/2006 | 14.35 | 0.00 | -22.0 | 14.35 | -7.8 |
| ▶ | ☐ | NetLogic Microsystems Inc. | NETL | 38.00 | 06 JUN 40 | LKTFH | 2.55 | 35.45 | 6.7 | 12.8 | 6/16/2006 | 32.08 | 0.00 | -24.7 | 32.08 | -9.5 |
| ▶ | ☐ | Gol Linhas Aereas Inteligentes | GOL | 36.42 | 06 JUN 40 | GOLFH | 1.30 | 35.12 | 3.6 | 13.9 | 6/16/2006 | 31.83 | 0.00 | -26.5 | 31.83 | -9.9 |
| ▶ | ☐ | Home Solutions of America Inc. | HOM | 9.35 | 06 JUN 10 | HOMFB | 0.65 | 8.70 | 7.0 | 14.9 | 6/16/2006 | 7.53 | 0.00 | -32.8 | 7.53 | -13.4 |
| ▶ | ☐ | Ceradyne Inc. | CRDN | 54.63 | 06 JUN 60 | AUEFL | 1.80 | 52.83 | 3.3 | 13.6 | 6/16/2006 | 45.55 | 0.00 | -31.7 | 45.55 | -13.8 |
| ▶ | ☐ | RPC Inc. | RES | 26.61 | 06 JUN 30 | RESFF | 0.85 | 25.76 | 3.2 | 16.5 | 6/16/2006 | 21.53 | 0.00 | -39.3 | 21.53 | -16.4 |
| ▶ | ☐ | Southwestern Energy Co. | SWN | 36.14 | 06 JUN 40 | SWNFH | 1.20 | 34.94 | 3.3 | 14.5 | 6/16/2006 | 29.13 | 0.00 | -37.3 | 29.13 | -16.6 |
| ▶ | ☐ | Joy Global Inc. | JOYG | 63.02 | 06 JUN 70 | JQYFN | 2.30 | 60.72 | 3.6 | 15.3 | 6/16/2006 | 50.05 | 0.00 | -39.9 | 50.05 | -17.6 |
| ▶ | ☐ | Randgold Resources Ltd. | GOLD | 23.07 | 06 JUN 25 | GUDFE | 0.90 | 22.17 | 3.9 | 12.8 | 6/16/2006 | 18.27 | 0.00 | -36.8 | 18.27 | -17.6 |
| ▶ | ☐ | Encore Wire Corp. | WIRE | 40.00 | 06 JUN 45 | EJOFI | 1.40 | 38.60 | 3.5 | 16.6 | 6/16/2006 | 31.17 | 0.00 | -44.4 | 31.17 | -19.2 |
| ▶ | ☐ | Trade Station Group Inc. | TRAD | 16.03 | 06 JUN 17.5 | ULRFW | 0.50 | 15.53 | 3.1 | 12.7 | 6/16/2006 | 12.53 | 0.00 | -39.7 | 12.53 | -19.3 |
| ▶ | ☐ | US Concrete Inc. | RMIX | 13.68 | 06 JUN 15 | RQSFC | 0.45 | 13.23 | 3.3 | 13.4 | 6/16/2006 | 10.54 | 0.00 | -42.3 | 10.54 | -20.3 |
| ▶ | ☐ | Candela Corp. | CLZR | 23.04 | 06 JUN 25 | UKZFE | 1.15 | 21.89 | 5.0 | 14.2 | 6/16/2006 | 15.77 | 0.00 | -58.5 | 15.77 | -28.0 |
| ▶ | ☐ | Eagle Materials Inc. | EXP | 66.72 | 06 JUN 75 | EXPFO | 2.25 | 64.47 | 3.4 | 16.3 | 6/16/2006 | 40.66 | 0.00 | -84.5 | 40.66 | -36.9 |

Remove all checked results  [Remove]

Summary

Successful positions: 4 out of 20 (20%)
Avg. % Return: -11.5%
QQQQ % Return: -10.2% (4/27/2006 to 6/16/2006)
SPX % Return: -4.6% (4/27/2006 to 6/16/2006)

Figure 11

OPTION SEARCH CRITERIA TESTING

CROSS REFERENCE TO RELATED APPLICATIONS

The present application claims priority to U.S. Patent Application 60/815,966 filed on Jun. 22, 2006 titled "System and Method For Option Back Testing," the contents of which are hereby incorporated by reference.

The present application is related by subject matter to U.S. patent application Ser. No. 11/611,043 filed on Dec. 12, 2006 titled "Interactive Internet Analysis Method," U.S. patent application Ser. No. 11/243,216 filed on Oct. 4, 2005 and entitled "System and Method For Searching For High Return Option Strategies," U.S. patent application Ser. No. 10/607,418 filed on filed Jun. 26, 2003 and entitled "Improved System And Method For Analyzing And Searching Financial Instrument Data," U.S. patent application Ser. No. 09/676,374 filed on Sep. 29, 2000 and entitled "System And Method For Analyzing And Searching Financial Instrument Data," U.S. patent application Ser. No. 09/524,205 (now U.S. Pat. No. 7,165,042) filed on Mar. 13, 2000 and entitled "Interactive Internet Analysis Method," and U.S. patent application Ser. No. 09/086,738 (now U.S. Pat. No. 6,049,783) filed on May 29, 1998 titled "Interactive Internet Analysis Method," the contents of which are hereby incorporated by reference in their entirety.

FIELD OF THE APPLICATION

The present application relates generally to on-line financial data systems, and more particularly, to computer systems and methods for searching for option investment strategies.

BACKGROUND

Systems and methods have been developed that allow individuals to use their own search parameters to search for financial instruments such as, for example, stocks, bonds, stock options, and option strategies such as covered calls, covered puts, spreads, etc. For example, U.S. Pat. No. 6,049,783 entitled "Interactive Internet Analyis Method," U.S. patent application Ser. No. 10/607,418 filed on filed Jun. 26, 2003 and entitled "Improved System And Method For Analyzing And Searching Financial Instrument Data," and U.S. patent application Ser. No. 09/676,374 filed on Sep. 29, 2000 and entitled "System and Method for Analyzing and Searching Financial Instrument Data," describe systems and methods for searching for and implementing stock option strategies.

Existing systems are dedicated to allowing users to search for option strategy investments using data that reflects current market conditions. For example, users search current market data and values for screening parameters that are derived from that current market data to identify existing option investments that suit their investment interests. Applicants have sought to improve upon these systems.

SUMMARY

Applicants disclose systems and methods that allow users to test screening searches against historical data. The systems and methods allow users to analyze and consider the outcomes of combinations of option investment search criteria by running the search criteria against actual market data. Upon identifying a particular set of search criteria or search strategy that is found to be promising based upon the performance on historical data, the user may apply the search criteria or strategy to financial data reflecting current market conditions in order to identify existing investment opportunities. This method of analyzing screening searches against data reflecting past market conditions is sometimes referred to herein as "back testing."

In an exemplary system, a repository of historical option data is created and maintained. The repository of historical option data is created by collecting, perhaps over the Internet and from multiple sources, information on stocks, indexes, and options. The financial data is processed to derive values for a set of searchable screening parameters corresponding to stocks, indexes, and options. The financial data and values for the searchable parameters are saved as a repository of historical option data so as to be available for searching in the future. For example, the financial data and values for the searchable parameters may be saved at the end of the day, at the close of the markets, or at some other time. On days for which new market data is available, and over a period of time, which may be several days, weeks, months, or even years, the financial data and calculated values for search parameters are stored and maintained.

A user defined search may be received to search the historical option data repository for an option investment using the financial data and values for the searchable parameters that have been stored over time. The user defined search may request a search for an option investment strategy such as, for example, a covered call, covered put, collar, bull put credit spread, bear call credit spread, bull call debit spread, bear put debit spread, calendar spreads, speculative buy calls, and speculative buy puts, or any other option investment. Additionally, the user-defined search may define the time period for which the search should be performed. For example, if the search is for a covered call, the request may specify that a search be performed for a particular month and on a particular day in the past. An exemplary system may further allow for the user to specify the end date for the search. This allows for specifying a period of time from start to finish so as to allow tests of search criteria or strategies over certain periods of time in the past. This enables evaluation of option strategies and search parameters for identifying those strategies over up, down, and neutral markets. The capability to specify a test time period allows the tester to evaluate a search strategy and investment opportunities over different market conditions. One strategy may be better in an up market and another better in a down market.

The request is processed against the historical option database of financial data and values for searchable screening parameters that have been accumulated over time. For example, in the situation where the request had specified a search for covered calls, the database of historical data is searched to identify covered call investment opportunities that were available during the period specified in the request. The search may comprise calculating returns for the option investment.

A list of option investments satisfying the user defined search criteria is identified and formatted to be forwarded to the requester. Typically, the option investments are formatted in a list along with the appropriate details regarding each option investment. Depending upon the type of option investment that was specified in the request, the detailed information that is forwarded back to the user may vary.

The user receives the information at their workstation and can browse the results. The user may then request additional information about one or more of the option investments that are presented. For example, the user may request additional information regarding what would have happened to one of the investment option positions had it been held until expiration or some other date. Alternatively, the user may request a group analysis of the option investments that were shown to the user.

The request for additional information is forwarded back to the server, which processes the request to determine the appropriate information. In the case that additional information is requested for a particular option investment, the return for that particular option investment at different points in time are retrieved. In the case that the user requested a group analysis for all of the listed option investments, the results are retrieved for each of the option investments at the end of the test period or other date specified by the user. The results are formatted and transmitted back to the user.

A user may further specify a portfolio of option investments. Upon viewing the results of a search against the database of historical option data for an option investment such as, for example, a covered call, a user may select to add a particular option investment to a portfolio. The request to add the item to a portfolio is forwarded back to the server, which stores the information identifying the contents of the portfolio. Thereafter, users may recall the portfolio or select a few stocks from the original screen and test it against historical data for performance. Also, users may select to update the portfolio by adding or removing option investments to the portfolio.

Users may repeatedly forward search criteria to the system to test the criteria and investment strategies against the historical data. The user may modify the search criteria to fine tune the search for intervals of time having market conditions that the user is particularly interested in. After testing the search criteria against the historical data, a user may request that their search criteria be saved. The user may then use the saved search criteria, having been tested against historical market data, to search financial data reflecting current market conditions in order to identify existing investment opportunities.

Additional features of exemplary embodiments are described below.

BRIEF DESCRIPTION OF THE DRAWINGS

Other features of the disclosed embodiments are further apparent from the following detailed description taken in conjunction with the accompanying drawings, of which:

FIG. 8 depicts an illustrative data screen that may be employed in an exemplary system to specify option screening parameters;

FIG. 9 depicts another illustrative data screen that may be used in an exemplary system to present results from a search of historic option data;

FIG. 11 depicts another illustrative data screen that may be employed in an exemplary system to provide results from a request for further analysis of a set of option investments.

DETAILED DESCRIPTION OF ILLUSTRATIVE EMBODIMENTS

Figure 1:
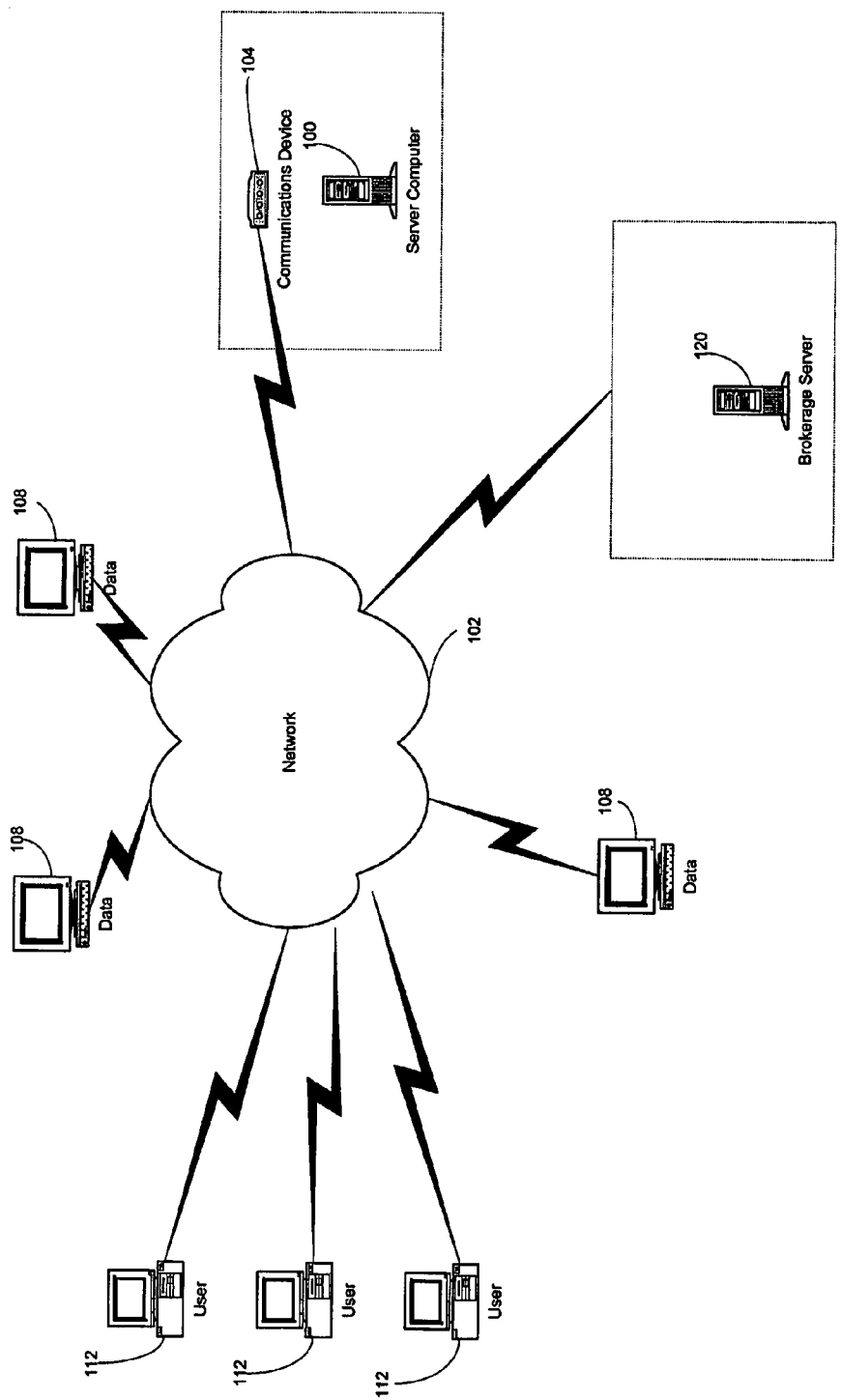
FIG. 1 is a high level diagram of a network for providing financial data.

Illustrative embodiments of systems and methods for testing option investment search strategies using historical option data are described below with reference to FIGS. 1 through 11. It will be appreciated by those of ordinary skill in the art that the description given herein with respect to those figures is for exemplary purposes only and is not intended in any way to limit the scope of the potential embodiments. For example, while the exemplary systems and methods refer to testing option search strategies for searching for covered calls, the scope of the application is broader and includes testing and searching for search criteria for other option investment strategies such as, for example, naked puts, spreads, butterflies, etc. While the exemplary system is described with respect to collecting, analyzing, and searching stock and stock option data, the system likewise could be applied to collect, analyze, and search data related to bonds, mutual funds, commodities, indexes, currencies, and their derivatives, or any other type of instrument as well.

Applicants disclose herein exemplary systems and methods that allow users to test option investment strategies and search criteria against actual past historical data. In an exemplary embodiment, systems are employed to test option investment strategies and search criteria for option strategies involving call options and put options. A call option is an option contract that gives the holder the right to buy a certain quantity (usually 100 shares) of an underlying security, such as a stock, from the writer of the option, at a specified price (the strike price) up to a specified date (the expiration date). A put option is an option contract that gives the holder the right to sell a certain quantity of an underlying security to the writer of the option, at the strike price up to the expiration date.

Investment strategies related to put options and call options include covered calls and covered puts. A covered call is an investment wherein a call option is sold while simultaneously holding an equivalent position in the underlying security. A covered put is an investment wherein a put option is sold while maintaining a short position on an equivalent amount in the underlying security. When an option is purchased without owning the underlying stock, the option is said to be naked. Thus, a naked call is an investment wherein a call option is written without owning the corresponding number of shares of the underlying stock. A naked put is an investment wherein a put option is written without shorting the underlying stock.

The put option and the call option are basic financial instruments to which the exemplary system is directed. However, the exemplary system is more sophisticated and provides greater assistance to investors by providing analysis of stock option spread strategies, which are investments that involve simultaneous positions in a plurality of stock options. Specifically, the exemplary system assist users in identifying desirable option spread strategies such as the following: bull put spreads; bear call spreads; calendar spreads; collar spreads; strangle spreads; butterfly spreads; and straddle spreads.

DEFINITIONS

A bull put spread is a spread strategy wherein a first put option is purchased and a second put option is sold, both generally having the same expiration date.

A bear call spread is a spread strategy wherein a call option with a higher striking price is purchased and a call option with a lower striking price is sold, both options generally having the same expiration date.

A bear call credit spread strategy is a bearish combination investment strategy where the investor realizes a profit by making cash from a net credit formed by the difference between the premium earned on a sold call and the premium paid for a bought call. While the stock goes down, the investor keeps the net difference in premiums.

A bear put debit spread strategy is a bearish combination investment strategy where the investor realizes a profit when the value of a long put increases as the stock price drops. The sold put helps to offset the cost of the long put and also provides a finite maximum risk level.

A bull call debit spread strategy is a bullish combination investment strategy where the investor realizes a profit when the value of a long call increases as the stock price rises. The sold call helps to offset the cost of the long call and also provide a finite maximum risk level.

A bull put credit spread strategy is a bullish combination investment strategy where the investor realizes a profit by making cash from a net credit formed by the difference between the premium earned on a sold put and the premium paid for a bought put. While the stock goes up, the investor keeps the net difference in premiums.

A butterfly spread is a spread strategy that involves combining a bull put spread and a bear call spread wherein four striking prices are involved, with the lower two being utilized in the bull spread and the higher two in the bear spread.

A calendar spread is a spread strategy in which a short-term option is sold and a longer-term option is purchased, wherein each option has the same or different strike prices.

A collar spread is an a spread strategy consisting of a standard covered call, wherein a call option is written and the underlying stock is purchased, and purchasing of a put option in the underlying company for downside protection.

A straddle spread is a spread strategy wherein an equal number of puts and calls having the same terms are either purchased or sold.

A strangle spread is a spread strategy involving a put option and a call option with the same expiration dates and different strike prices.

The disclosed system automatically derives returns for the above listed stock option spread strategies and allows users to search the return data as well as other parameters to identify desirable investments.

FIG. 1 is a high level diagram of the exemplary system for analyzing financial data which may be employed to service requests to test user search criteria and investment strategies against historical option investment data. Server 100 is a computing system that collects, analyzes, and provides access to financial data. Server 100 operates as a database server and a hypertext transfer protocol server and may comprise a single computing machine or a plurality of computers.

Data source servers 108 are computing systems that operate as repositories of financial data. The repositories may include both public and private sources. For example, data source servers 108 may include data servers operated by Data Transmission Network Corporation (DTN), Chicago Board of Options Exchange (CBOE), and Zacks Investment Research, as well as others.

Network 102 may be any electronic network including the Internet. User or investor terminals 112 provide users with access to server 100 via network 102 and communications device 104. User terminals 112 may be personal computers, hand-held computing systems, wireless phones, or any other suitable computing device. User terminals 112 are generally loaded with Internet browser software such as Netscape Navigator or Microsoft Explorer and are operable to communicate over network 102 to download data including web pages from server 100.

Brokerage server 120 is a server machine that provides a gateway to an organization such as a brokerage house or electronic trading system that executes trades in stocks, stock options, and the like. Brokerage server 120 provides an interface to the brokerage or system through which requests for execution of trades are routed. Brokerage server 120 may be operable to interface with a trading network such as Nasdaq or an electronic communication network (ECN) such as Archipelago, and route trades to such networks.

Generally, server 100 communicates with data source servers 108 to gather financial data related to financial instruments such as stocks and options. After downloading financial data from the data source servers 108, server 100 calculates values for various searchable financial instrument-screening parameters. With respect to the exemplary embodiment, server 100 derives returns for potential investments and searchable financial instrument screening parameters that may be used to screen for stock options and indexes. Server 100 then stores the financial data and the values for the searchable financial instrument screening parameters so as to have such data available for responding to requests to perform back testing of an investment strategy. This collection of data may be referred to as a repository or database of option data. Users access server 100 over network 102 to search the database for option strategies. Upon identifying a particular option investment strategy, a user may issue a request to execute a trade on the investment strategy. The request is routed from user terminal 112 to server 100. Server 100 forwards the request over network 102 to brokerage server 120 where the transaction is executed.

Figure 2:
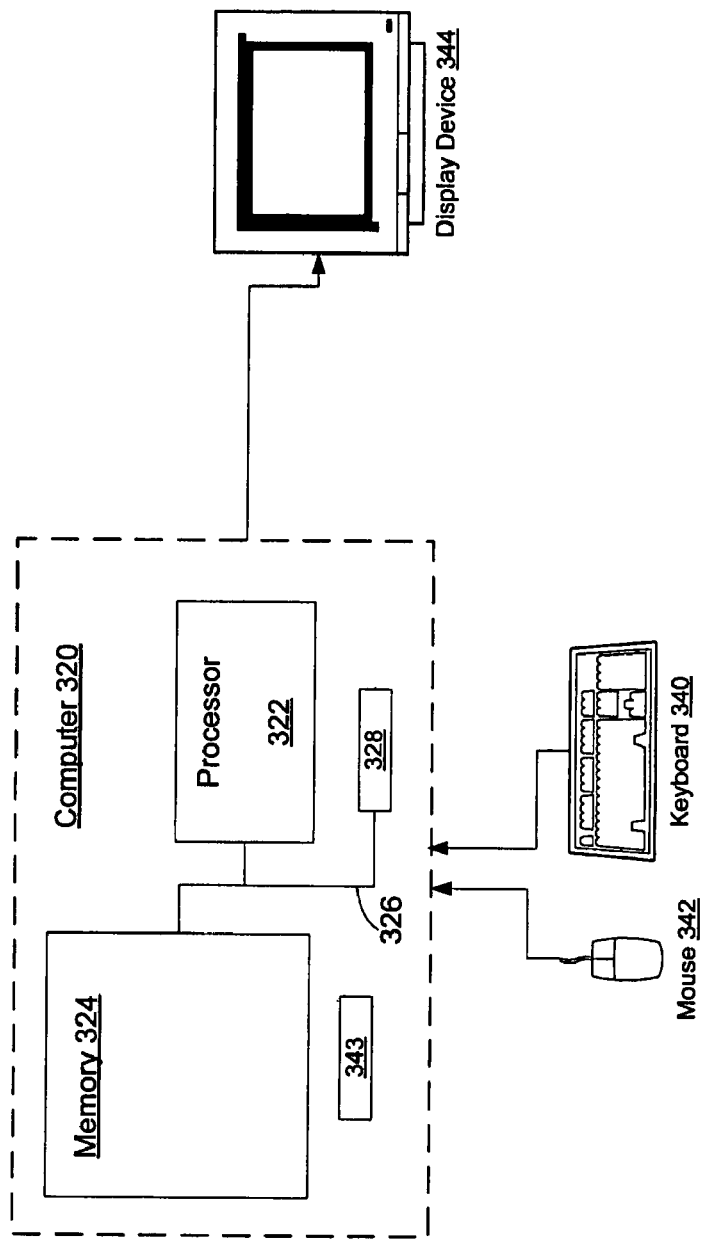
FIG. 2 is a diagram of a computing environment for use in the disclosed embodiments.

Server computer 100, data servers 108, brokerage server 120, and customer terminals 112 are generic computing systems. FIG. 2 is a block diagram of an exemplary computing system suitable for this use. As shown, computing device 320 includes processing unit 322, system memory 324, and system bus 326 that couples various system components including system memory 324 to the processing unit 322. The system memory 324 might include read only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which may be, for example, a modem, provides for communications over network 102. Processor 322 can be programmed with instructions to interact with other computing systems so as to perform the algorithms and serve the web pages described below with reference to FIGS. 7 through 11. The instructions may be received from network 102 or stored in memory 324 and/or hard drive 328. Processor 322 may be loaded with any one of several computer operating systems such as, for example, Windows NT, Windows 2000, or Linux.

Figure 3:
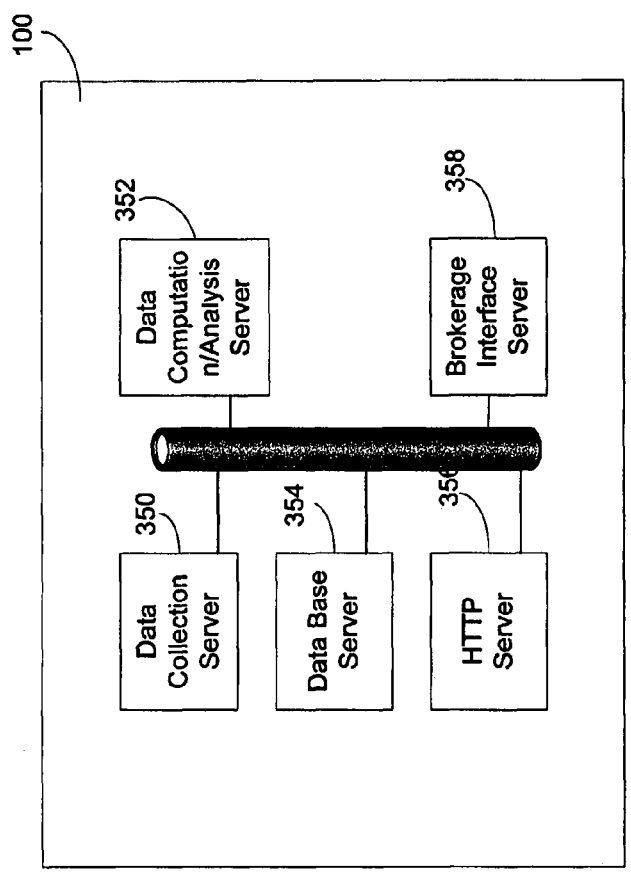
FIG. 3 is a block diagram depicting functional components of a server machine.

FIG. 3 is a diagram of the functional components of server 100. As shown, server 100 comprises data collection server 350, data computation/analysis server 352, database server 354, hypertext transfer protocol (HTTP) server 356, and brokerage interface server 358. Data collection server 350 operates to download financial instrument data from data servers 108. Data computation/analysis server 352 operates to compute searchable financial instrument screening parameters from the financial instrument data. Database server 354 maintains and provides access to the financial instrument data and searchable parameters. Database server 354 maintains a repository of financial instrument data and searchable parameters to reflect current market conditions and market conditions in the past. A repository of historical option data may comprise financial instrument data and values for searchable parameters that go back days, weeks, months, and even years. Database server 354 may comprise any of numerous commercial database software systems such as those produced by Oracle Corporation and Microsoft Corporation. Database server 354 handles queries of the financial instrument data and searchable financial instrument screening parameters. HTTP server 356 maintains hypertext mark up language (HTML) pages, serves dynamic HTML objects, and provides fault tolerance and load balancing. HTTP server 356 may comprise any of several well-known HTTP server software systems, such as, for example, the Windows NT server produced by the Microsoft Corporation. Brokerage interface server 358 operates to forward trade orders for financial instruments. These orders may be forwarded to a brokerage and/or to a trading system such as the Nasdaq or an ECN. It should be noted that server 100 might comprise a single computing machine or a plurality of computing machines. Furthermore, data collection server 350, data computation/analysis server 352, database server 354, HTTP server 356, and brokerage interface server 358 may be comprised in a single software server and further may be located on a single computer system. As depicted in FIG. 3, servers 352, 354, 356, and 358 are operable to communicate with each other as necessary.

Figure 4:
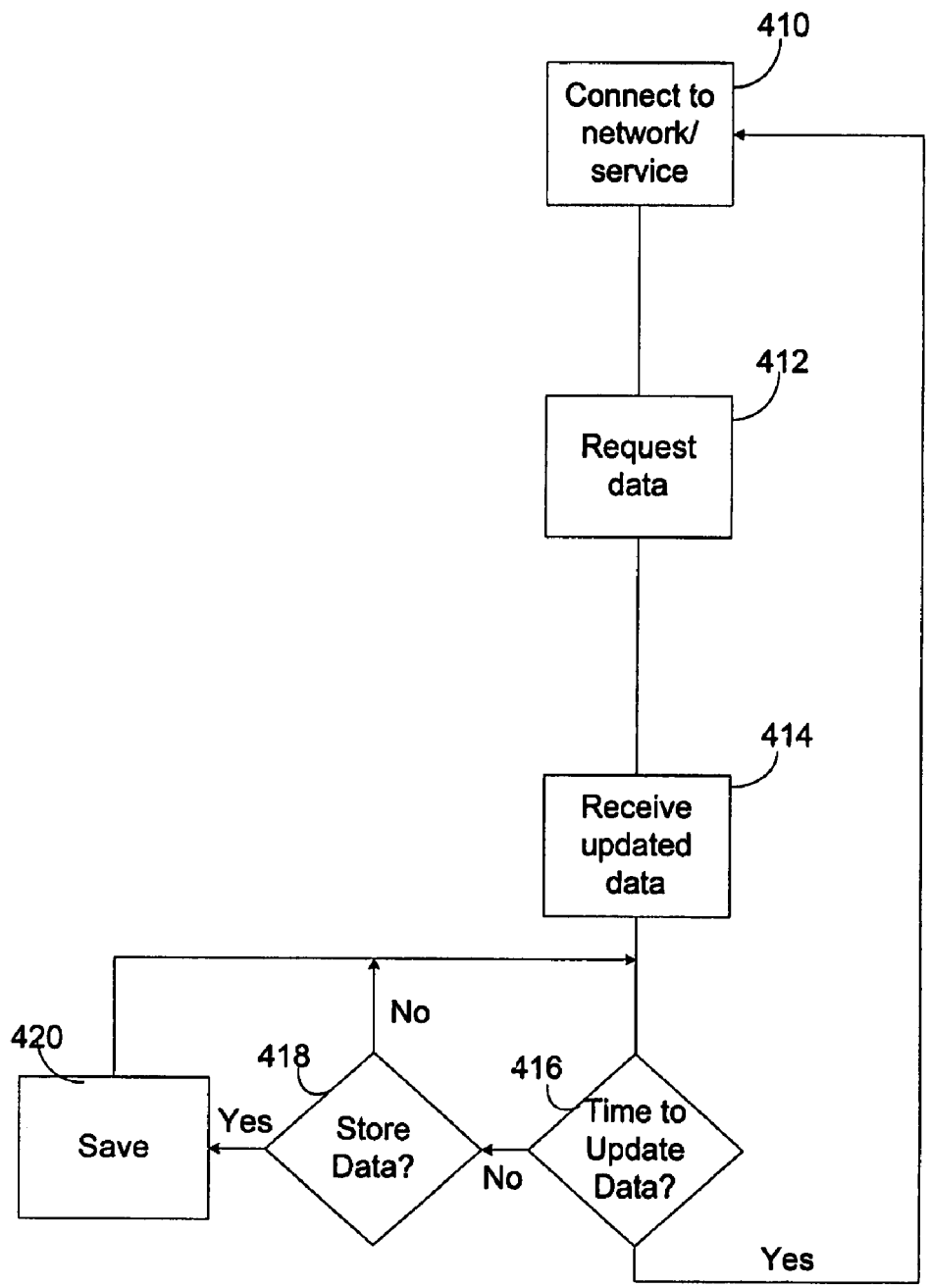
FIG. 4 is a flow chart of a process for retrieving financial data over a network.

FIG. 4 provides a flow chart of a process performed by server 100 for retrieving financial data from data servers 108. As shown, at step 410 servers 100 establish a connection to network 102 if one does not already exist. At step 412, server 100 issues a request to one or more data servers 108. The request identifies to data server 108 which data is being requested. At step 414, the requested data is received at server 100. In an exemplary system, the financial data that is downloaded relates to stocks and stock options. Accordingly, in the exemplary system, the financial data may comprise the following: stock symbol—denoting the trading symbol for stock in a particular company; option symbol—denoting the trading symbol for a stock option in a particular company; stock ask price—denoting the asked price or closing price of the underlying stock; expiration/strike price—denoting the month a particular option expires and the price of the option; option bid—denoting the highest price for a market sell order of a particular option; option volume—denoting the number of options contracts traded in the current trading day; open interest—denoting the number of option contracts in the life of a contract; p/e ratio—denoting the price to earnings ratio using last years earnings; average recommendation—denoting the average broker recommendation for a particular stock (a numerical rating with numeral 1 signifying the best and numeral 5 signifying the worst); share—denoting the number of common shares outstanding; beta—denoting a measure of stock volatility relative to the Standard and Poor's 500 index; company name—indicating the name of a company; Zack's indicator—denoting an industry classification; and recommended list—denoting a list of advisory service recommendations. This data may be downloaded from one or multiple sites to server 100.

In an exemplary embodiment of the disclosed system, the financial data is periodically downloaded during a trading day so that the data and parameters calculated there from reflect recent market fluctuations. In one embodiment, for example, the data may be updated every 20 minutes. However, periods of greater or lesser frequency may be employed. For example, financial data may be updated continuously in real time. Thus, as shown in FIG. 4, at step 416, it is determined whether the financial data should be updated. If the financial data needs to be refreshed, control returns to step 410. U.S. patent application Ser. No. 10/607,418, the contents of which are hereby incorporated by reference in their entirety, discloses systems and methods whereby even if financial data is downloaded periodically, results from user-defined searches and requests reflect very recent market data. If at step 416, the data is not ready to be updated, at step 418 it is determined whether the market data should be stored for use in back testing, i.e. testing option investment search criteria and strategies against historical data. For example, if the markets have closed for the day, there may be no further updates and it may be suitable to store the current data in the database of historical option data so that it may be accessed in the future. If so, at step 420, the financial data is saved so as to preserve it for use in search strategy back testing. If at step 418 additional data updates may be received, the system continues to wait until the appropriate time to retrieve an update.

Figure 5:
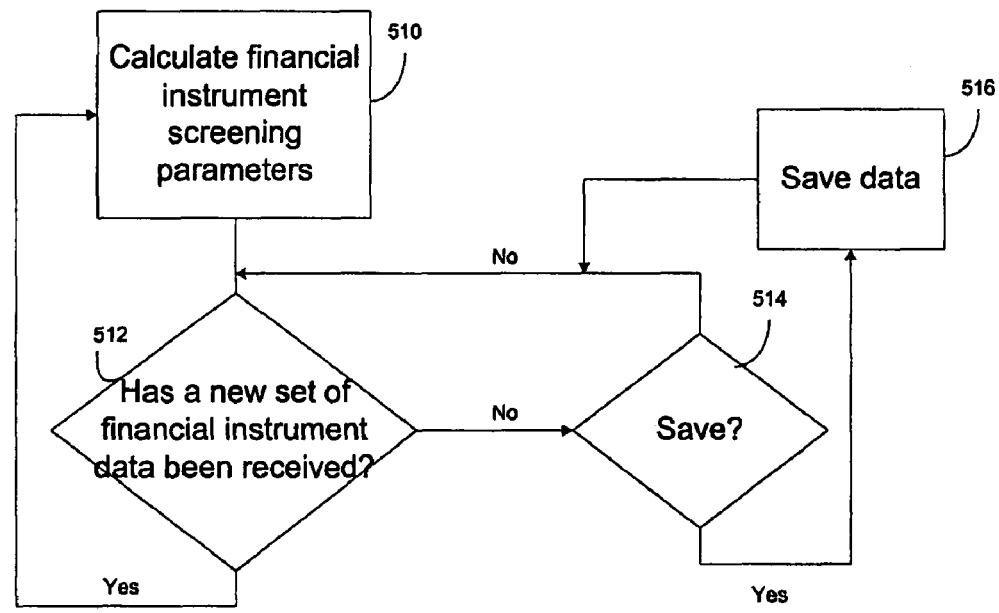
FIG. 5 is a flow chart of a process for calculating values for financial screening parameters.

Server 100 uses the downloaded financial data to derive returns on option strategies and to calculate values for a plurality of screening parameters. FIG. 5 provides a flowchart of this process. As shown, at step 510, server 100 uses the financial data that was previously downloaded to derive returns on possible spread strategies such as, for example, covered calls, bull-put spreads, and bear call spreads as well as other screening parameters. U.S. patent application Ser. No. 10/607,418, the contents of which are hereby incorporated by reference in their entirety, discloses details regarding various types of screening parameters for which data may be calculated. Screening parameters that may be calculated by server 100 may comprise, for example, the following: percentage option volume—denoting the ratio of the number of options contract traded that day to the average option volume over a defined number of previous days, e.g. 30 days; percentage if not assigned—denoting the ratio of the sum of the option bid and stock price appreciation to the difference between stock price and option bid; percentage if assigned—denoting the ratio of option bid to the difference between stock price and option bid; percentage EPSG (Earnings Per Share Growth)—denoting the ratio of the difference between earnings last year and earnings this year to earnings last year; percentage range—denoting the percentage of range between the year's high and low for the stock which is calculated as the ratio of the difference between the current stock price and the low stock price for the year to the difference between the high stock price for the year and the low stock price for the year; percentage volume—denoting the percentage change from the previous day's volume on the stock and calculated as the ratio of the previous day's stock volume to the average number of shares traded in 60 days; percentage yield—denoting the annual dividend yield on the underlying stock and calculated as the ratio of four times the dividend yield per quarter to the price of the underlying stock; delta—denoting the change in option price versus the change in stock price; Black-Scholes Ratio—denoting the bid price divided by the Black-Scholes value for the particular option; volatility—denoting the historical price volatility of the stock and calculated by measuring the annual standard deviation of the daily price changes in the stock; implied volatility—denoting the volatility based on the actual price of the option as opposed to the historical price fluctuation; and percentage to double price—denoting the percent price movement in the stock price to cause the option to double in price.

The calculated parameters are useful to potential investors in deciding which investments to make. For example, the Black-Scholes ratio provides an effective tool for comparing investment values. Generally, Black-Scholes is a model for options pricing. The Black-Scholes model uses information such as the historical volatility of the underlying stock, time to expiration, and the risk free interest rate to estimate a fair value for an option. In an exemplary embodiment of the disclosed system, the Black-Scholes ratio is calculated by dividing the option estimate calculated using the Black-Scholes model into the actual value of the option as determined by the market. The ratio provides the investor with an indication whether a particular option is under or over valued. The ratio is greater than one if the option is over valued relative to the Black-Scholes theoretical value. The ratio is less than one if the option is under valued relative to the Black-Scholes theoretical value. The ratio information can be very useful to investors who are considering buying or selling an option or spread strategy.

Option volume percentage is another of the calculated parameters. Stock volume has long been used as an indicator of stock activity but has not been as reliable with the advent of derivative products such as options. Option volume provides faster feedback than stock volume on breaking news but analysts are faced with the problem of deciding which month or strike price to consider. The option volume percentage parameter employed in an exemplary system solves this problem by creating an indicator, which is the sum of all option volume for puts and calls for all months. The aggregate number is a good indicator of this activity and is not as sensitive to the time of the month relative to expiration or the closeness of the stock price to the strike price. It is a more universal indicator of activity. In order to observe relative changes to this activity, the option volume for the day is compared to the average volume over some period of time, such as 30 or 50 days average. The volume is measured as a percentage change from this average.

In addition to calculating the various parameters mentioned above, the disclosed system also calculates returns for a plurality of different options and option spread strategies including covered calls, covered puts, naked calls, naked puts, bull put spreads, bear call spreads, strangle spreads, straddle spreads, calendar spreads, collars spreads, and butterfly spreads. With respect to the covered calls and covered puts, the return values include the percentage if assigned, which represents the percentage return if the option is called, and percentage if not assigned, which represents the percentage return on the transaction if the option is called. With respect to the naked calls and naked puts, the percentage naked return is calculated, which represents the return based on the margin requirements for the particular option. With respect to the various spreads, the percentage returns are calculated which represent the maximum profit realized from the spread as a percentage of the margin requirement.

It should be noted that, with respect to all of the options and option spread strategies, the percentage returns are available as search parameters in addition to the many other search parameters. Accordingly, users can locate an option or option spread based upon percentage return and evaluate the return in light of the investment risk as dictated by the other investment parameters. Having the return data available is especially useful to investors in assessing the risk verses reward of an investment.

Referring back to FIG. 5, at step 512, server 100 determines whether the financial instrument data has been updated. If so, the potential option investment returns and other screening parameters are updated at step 510. If at step 512, no updating of the screening parameters is necessary, at step 514, it is determined whether the current values for the screening parameters should be saved for use in the future in back testing. For example, in an embodiment, it may be determined that there may be no further updates to the underlying financial data as the markets may have closed. At step 516, the current set of instrument screening parameters are saved in the historical option database so as to preserve it for use in back testing. Thus, in an exemplary embodiment, the system creates a database or repository of historical option data comprising financial market data and values derived from the financial market data for search screening parameters. The financial data and values derived from the financial market data reflect market conditions on each of a plurality of days in the past.

Users at terminals 112 may issue requests to server 100 to search the historical financial data and screening parameters for stock options and related stock option strategies using the methods as specified in U.S. patent application Ser. No. 11/243,216, U.S. patent application Ser. No. 10/607,418, U.S. patent application Ser. No. 09/676,374, and U.S. patent application Ser. No. 09/086,738, the contents of which are hereby incorporated by reference. By searching against the historical financial data, users can test search criteria and option investment strategies against actual market data. This provides an opportunity for investors to test techniques and hypothesis against actual market data.

Figure 6:
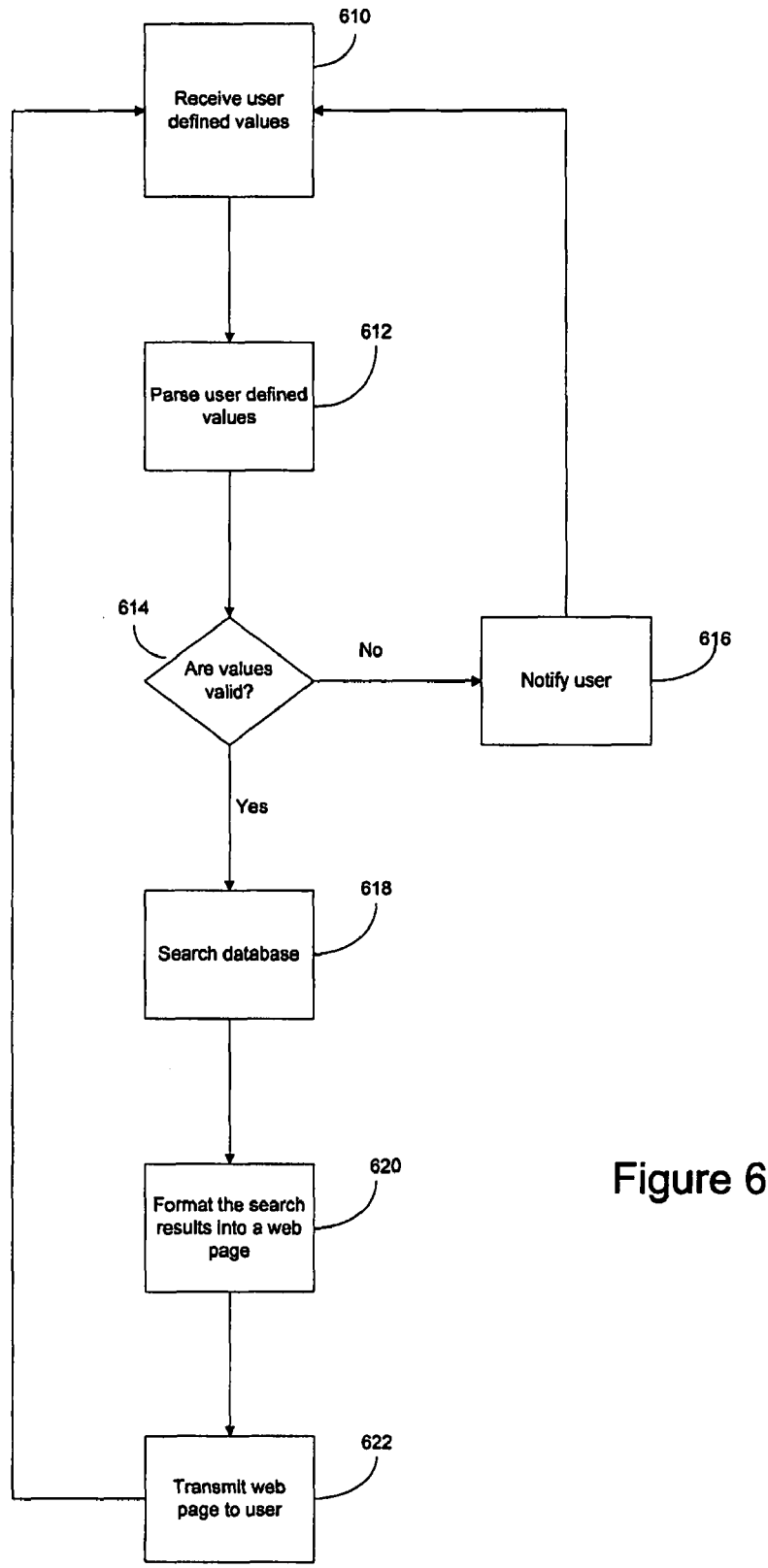
FIG. 6 is a flow chart of a process for servicing user requests for option investments offering the possibility of a high return.

A flowchart of an exemplary process for servicing user requests to test search criteria and option investment strategies against historical data is depicted in FIG. 6. As shown in FIG. 6, at step 610 a user's request to perform a search is received. The request may be received at, for example, HTTP server 356. The information comprised in a request may vary, but may comprise, for example, an identification of an option strategy such as, for example, a covered call, covered puts, naked calls, naked puts, bull put spreads, bear call spreads, strangle spreads, straddle spreads, calendar spreads, collars spreads, and butterfly spreads. The request may further specify the period for which it is desired to search the historical market data including stored search parameters. The request may also specify a beginning date and an end date for the search. Alternatively, default values such as the current date may be used for an end date.

Figure 7:
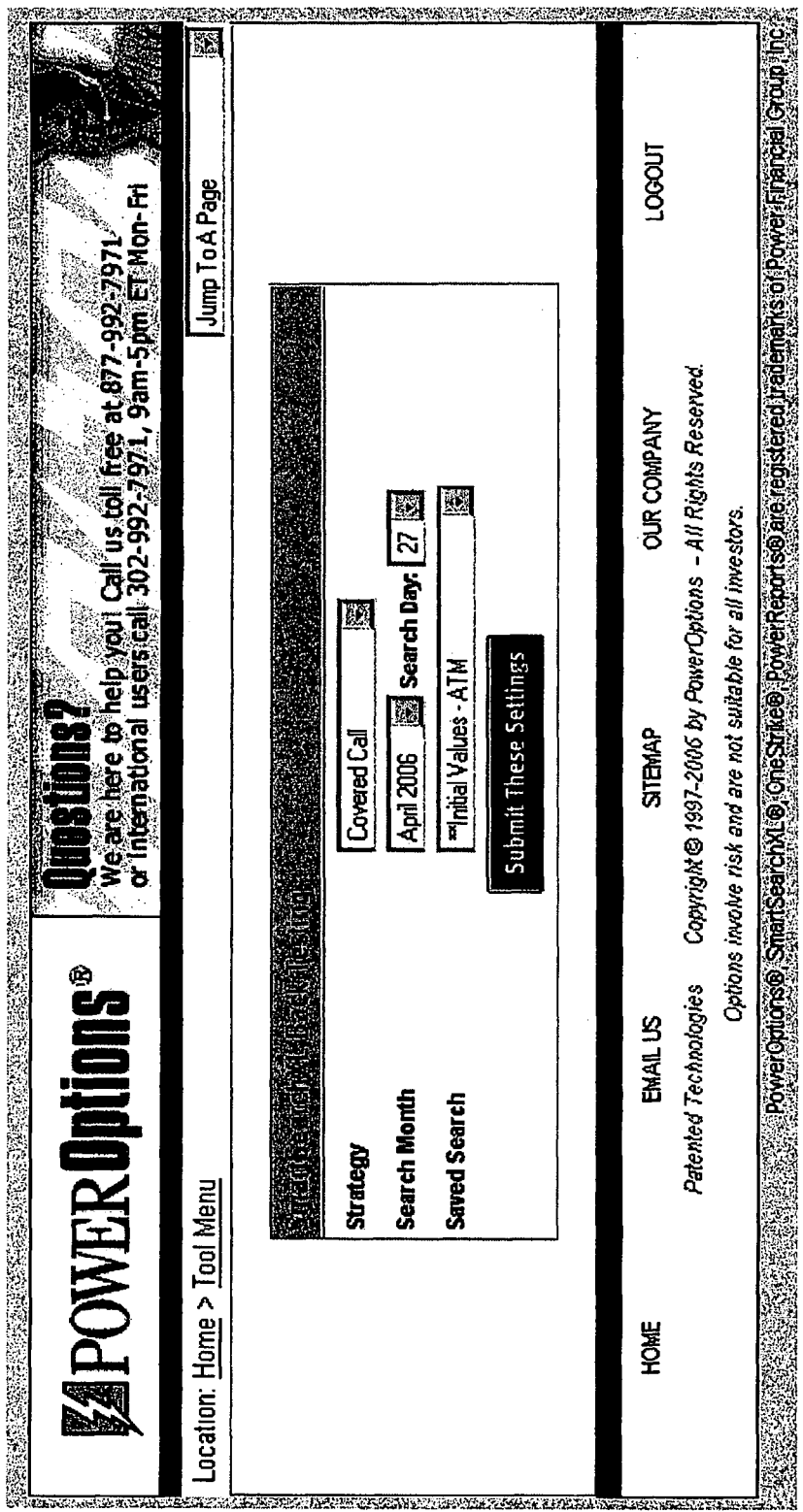
FIG. 7 depicts an illustrative data screen that may be used in an exemplary system to enter a request to search historical option data for option strategies.

FIG. 7 depicts a screen that may be used in an exemplary system by users to initiate a back testing search of historical data. The screen may initially be created at server 100 as an HTML file that is transmitted to the user's workstation. In the embodiment depicted in FIG. 7, the option strategy is selected using a drop down menu. In the illustrative example shown, the strategy identified is a covered call, but any option strategy can be selected. A user may further enter a search month, which is the month in the past for which it is desired to search for the identified strategy. The user may also select a search day, which refers to the first day of tracking for which screening parameters are applied. The screen may also allow for the user to specify an end date or "last day" for the search. The last day defines the end of the holding period over which the returns are calculated, i.e. Return=(Value on the last day−Value on search day)/Value on search day.

Users may further define the particular screening values that they wish to have used to screen the database for possible underlying stocks and their respective options that meet the criteria set by those parameters. In the exemplary embodiment, the screening values may be assigned a name so as to allow for easy access. In the embodiment shown in FIG. 7, the saved sets of screening parameters appear in a pull down menu. The particular value shown in the diagram of FIG. 7 is titled "Initial Values—ATM." This title represents a set of values for the screening parameters.

Figure 8:
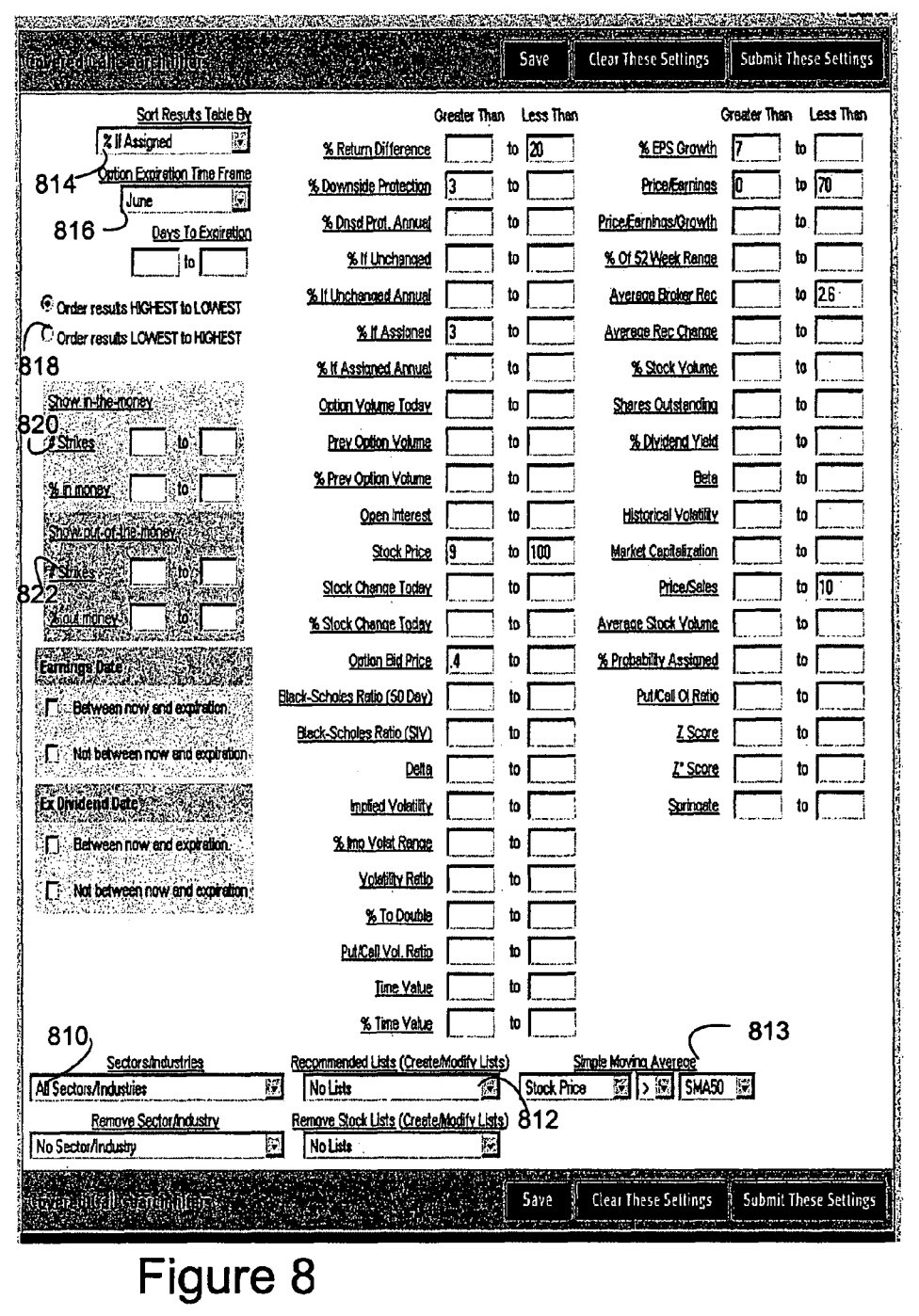

FIG. 8 is an exemplary screen that may be used to input the desired values for the screening parameters. In the exemplary embodiment of FIG. 8, the values are those relevant to a search for a covered call. However, the parameters for which values may be selected may change depending upon the desired option strategy. As shown, users may enter ranges of values for numerous search parameters including the following: percentage return difference; percentage if not assigned; percentage if assigned; option volume; open interest; stock price; option bid price; Black-Scholes ratio; delta; percentage option volume; implied volatility including percent range for volatility; percent change in volatility; percent change in open interest; percentage to double; percentage earnings per share growth; price to earnings ratio; percentage of range between the year's high and low stock price; average broker recommendation; percentage change in stock or option volume; number of shares outstanding; the annual dividend yield on the stock; beta which is a measure of the sensitivity of the security's price to changes in the S&P 500; and volatility. Users may also screen for options related to companies in a particular industry segment using industry segment pull down menu 810 or by whether an option is listed in a particular organization's recommended list using recommended list pull down menu 812. Using pull down menus 810 and 812, users can limit consideration to options relating to stocks of a particular quality and industry segment. It should be noted that in an embodiment, recommended list pull down menu may include one or more selections that are customized by the user to include companies that the customer finds desirable. Using the recommended list pull down menu 812, filtering and calculations can be restricted to the user's customized list. Also, using a sample moving average pull down menus 813, the values can restricted to stocks with a desired moving average. Thus, the customized list can be applied to the screening mechanism to optimize it and determine the best options to write.

Sorting column pull down list 814 allows a user to specify whether the results should be sorted by the values in a particular search parameter including any of the following: stock price; option bid price; option volume; open interest; percentage option volume; company name; percentage earnings per share; price to earnings ratio; percentage range; average brokerage recommendation; percentage volume; shares outstanding; expiration date; percentage yield; beta; volatility; Black-Scholes ratio; delta; implied volatility; and percent to double. Sorting month pull down list 816 allows a user to specify whether the results should be sorted by options coming due in a particular month. Order results radio buttons 818 allow for the user to specify whether the results should be listed by value from high-to-low or from low-to-high for the selection made in sort by pull down list 814. In-the-money screen area 820 allows the user to specify whether only options corresponding to covered call opportunities that are "in-the-money" should be displayed in the list of options. Out-of-the-money screen area 822 allows the user to specify whether only options that correspond to covered option opportunities that are "out-of-the-money" should be displayed. Both in-the-money and out-of-the-money results may be displayed together. Options corresponding to covered options that are "at-the-money" are displayed regardless of which radio button is selected.

The screen presented in FIG. 8 provides the capability to define screening parameters for covered calls. It is envisioned that a user could assign a name to the set of search criteria and save the search for use at a later time. A user could define multiple searches in this way and retrieve the search for use at a later date. Users can define search parameters for a desired option strategy other than covered calls using screens similar to FIG. 8, but with differences to account for the particular option strategy. Search criteria that are tested against historical data may be stored and later run against financial data representing current market conditions to locate existing option investments.

Referring back to FIG. 6, after the user's request is received at server 100, at step 614, server 100 parses the user defined values to determine if the values entered by the user are logical and operable for searching the database. For example, at step 614 server 100 might validate that a negative value is not inputted for a screening parameter that cannot, by definition, be negative. Accordingly, if at step 614, it is determined that the values entered by the user are not valid, at step 616, server 100 transmits a notification of such to the user. If the user-defined values are valid, however, at step 618, server 100 searches the database of historical option data for the period of time specified in the user request for the option strategies that satisfy the user-defined values. This searching step may comprise further calculations such as, for example, calculating returns over the time period specified in the user request. At step 620, server 100 formats the results of the database search for viewing via a web browser. The results include the list of stock options and/or stock option investment strategies that satisfy the user-defined query. At step 622, the search results, usually formatted as a web page, are transmitted to the user.

Figure 9:
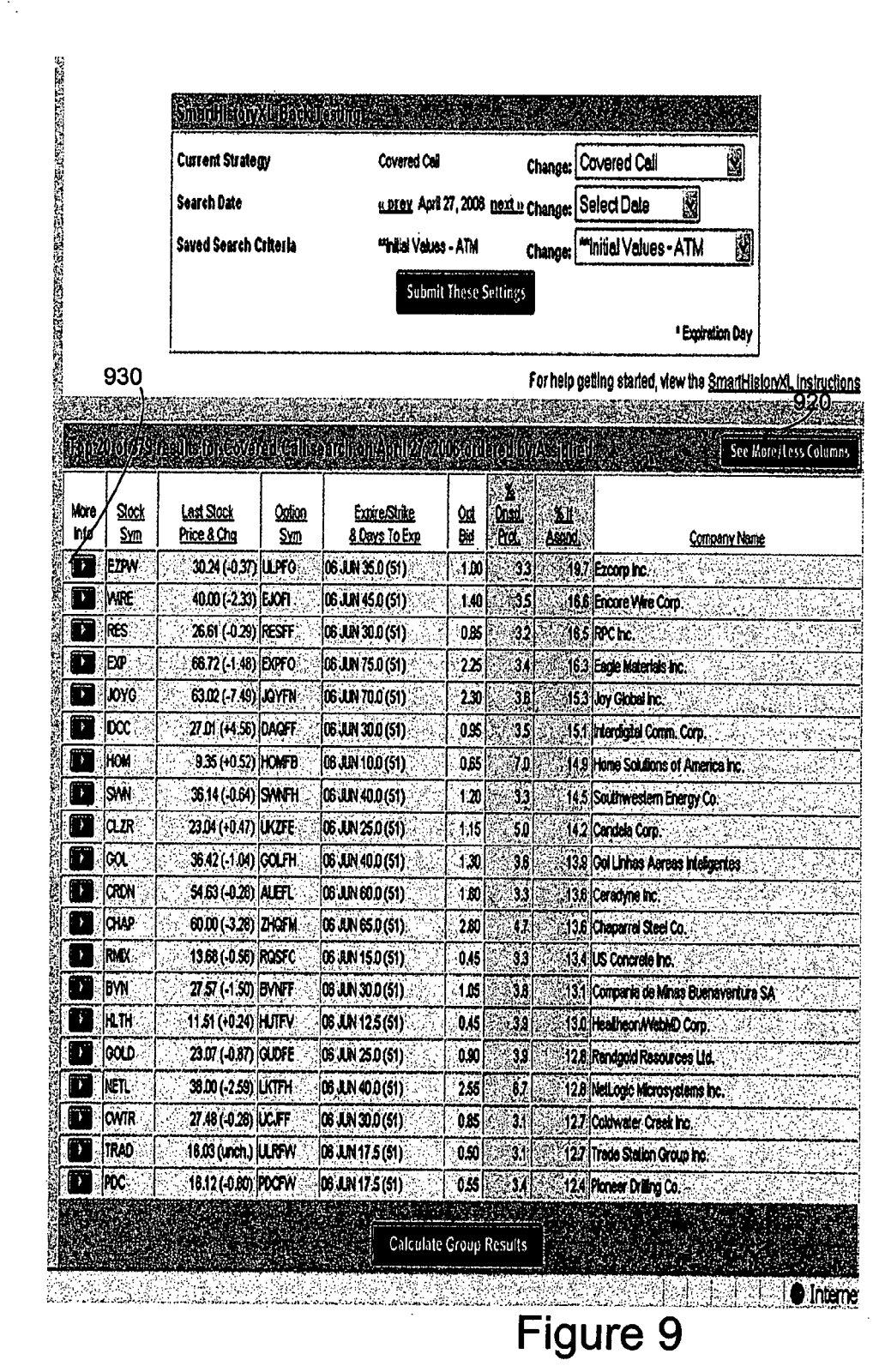

FIG. 9 provides an illustrative web page that may be used to transmit the results of a search back to the requestor. As shown, the top portion of the page reflects the search criteria that were entered. In the particular example illustrated, the search is for a covered call option strategy, with a search date of Apr. 27, 2006, using values for screening parameters saved with the name "Initial values—ATM." The user may elect to change the search criteria using, for example, pull down menus such as those illustrated in FIG. 9. For example, the user may choose to change the search date or period of time that a search is to cover. In the exemplary screen illustrated in FIG. 9, the user may change the date using a pull down menu or by clicking on the buttons labeled "prey" and "next" in order to increment or decrement the search date.

The bottom portion of the screen illustrated in FIG. 9 provides a listing of the results from the search of the historical data. The information that is presented for each option strategy may vary depending upon the particular option investment strategy that was specified in the search, but generally comprises information for evaluating the option investments that are listed. Information presented to the user for a particular option strategy may comprise the information that is specified for the various option strategies as specified in U.S. patent application Ser. No. 09/676,374, the contents of which are hereby incorporated by reference. In the embodiment depicted in FIG. 9, the information reflects a result for a search for covered calls. As shown, a list of 20 covered call investments is shown. For each covered call, the following information is listed: company name; stock symbol; last stock price and change; the option symbol; expiration and strike price and days to expiration; option bid.

As shown, a button 920 titled "See More/Less Columns" appears on the screen. This button may be used by the user to add or remove columns of information from the results that are displayed. Any of the parameters shown in FIG. 8 may displayed on the results portion of the screen depicted in FIG. 9 and are added via button 920.

The screen of FIG. 9 further comprises buttons 930 titled "More Info." These buttons may be depressed to obtain additional information about the particular stock and/or option investment, which in the case of the illustrative example, is a covered call. The additional information about the stock and/or option investment is retrieved from the historical data at server 100 for the date in the past for which the search was executed. Thus, all of the financial data relevant to the particular option investment as of the particular date in the past can be retrieved from the database.

Applicants have noted that viewing all of the information for all of the option investments on a single page can be overwhelming. Accordingly, users may exclude results from the viewing panel. The exclusions may be based upon selections from the screening parameters or some additional criteria. This feature may be implemented by providing for check boxes on the screen of FIG. 9 whereby a user may check a box to select to have results with a particular characteristic excluded. For example, a check box may indicate that option investments relating to the financial industry should be excluded.

According to an aspect of an exemplary embodiment, a user may select to produce a report showing what would have happened to an option position if it had been held until expiration or some other date. This feature might be accessed, for example, under a menu provided by pressing the "More Info" button. When a user requests such an analysis, the request is forwarded to server 100. The request identifies the particular option strategy, which in the exemplary embodiment discussed herein is a covered call, a beginning date for the analysis, and the date until which the analysis should carried through. Server 100 processes the request by retrieving the percentage returns using the historical database for the specified period. The results are forwarded across the network to the user's workstation.

Figure 10:
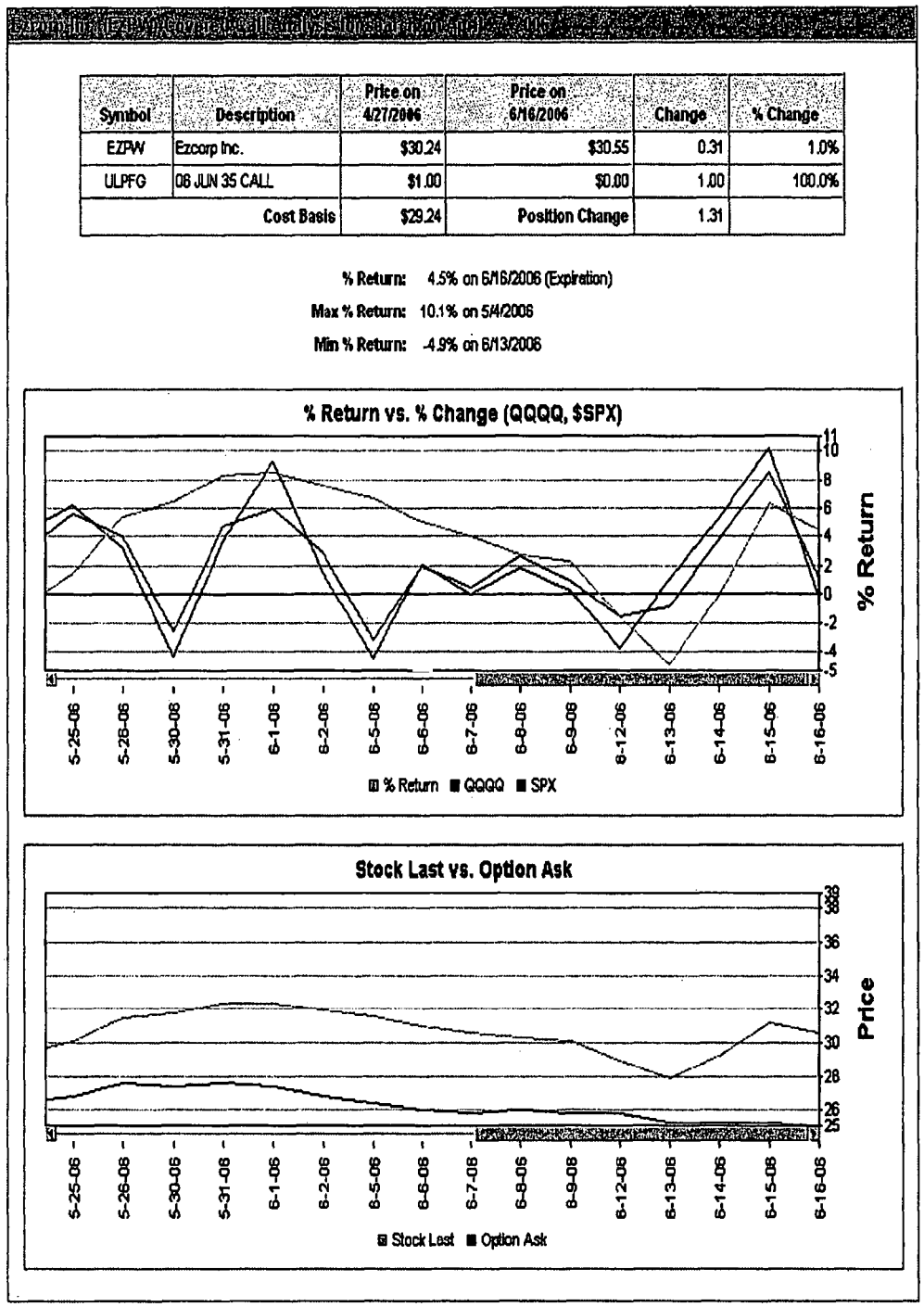
FIG. 10 depicts another illustrative data screen that may be employed in an exemplary system to provide results from a request for a detailed analysis of an option investment.

An exemplary screen for presenting data relating to the return on the option investment had it been held is shown in FIG. 10. In the exemplary screen of FIG. 10, the data presented shows the position of both the stock and the option on the scan date, which in the displayed screen is Apr. 27, 2006, and the results on the final date, which in this illustration is May 25, 2006. Also shown are the returns for the particular option strategy on the end date, the maximum return, and the minimum return. A first graph depicts the percentage return for the covered call as a function of time. A second graph depicts the price of the option and the price of the underlying stock as a function of time.

Another aspect of the disclosed system allows for further analysis of all of the option strategies on the results screen of FIG. 9. For example, the user may request to see the returns for all of the option investments. In an exemplary embodiment, the user may depress the "Analyze Results" button located at the bottom of the page to initiate this request. This causes a request to be forwarded to server 100 to provide an analysis of the returns and related information provided by each of the option investments. The user may further specify a particular date at which they wish to see the returns. If no date is specified, the default is the date that the request is made.

Server 100 processes the request to retrieve the returns for each of the option investments on the specified date. Server 100 calculates the returns, formats the results, for example, for display as a web page, and forwards the results to the user's workstation.

FIG. 11 is an example of a screen that may be used to display the results of a request for further analysis. The screen displays the results from a return analysis performed on the data displayed in FIG. 9. The top portion of the page provides definitions for values shown in the bottom portion of the screen. In the exemplary screen of FIG. 11, definitions are provided for % Downside Protection, Net Debit, Net Value, and Percent Return.

The bottom portion of the screen presents the detailed results. The results are shown from a list of option investments, with the values on the left showing the values for parameters that existed on the past date of the screen. In an exemplary embodiment, the information that is displayed comprises the name of the company, the stock symbol, the stock price, the strike month for the call option, the option symbol, the option bid, the option debit, the percentage of downside protection, and the percentage if assigned. On the right portion of the screen, which is the shaded area, the results for the option investments are show at the date specified in the original request. In the embodiment of FIG. 11, for the exemplary covered calls of FIG. 9, the information that is displayed comprises the end date specified in the request (or the default value), the stock price on that date, the option ask price on that date, the percentage in the money for the covered call investment strategy at that date, the net value for the covered call investment strategy at that date, and the percentage return from the option investment. A user may request additional information regarding any of the listed option investments. In the exemplary embodiment of FIG. 11, the additional information may be requested by clicking on the "More Info" button located to the left of each of the option investments.

At the bottom of the exemplary screen of FIG. 11, a summary is provided. The summary may comprise, for example, an indication of the number of option investments in the list that have a positive return, and an average of the percentage return for those option investments. Additionally, the exemplary system may present an indication of returns yielded by other investment opportunities during the same or similar period. In the exemplary screen illustrated in FIG. 11, values are provided for returns provided by an investment in Nasdaq and S&P tracking indices.

After viewing the results, a user may decide to change the end date for which the returns are calculated. Accordingly, FIG. 11 provides a menu item 1110 that allows the user to change the end date and thereafter resubmit the query so as to test the strategy across a different period of time.

Another aspect of the disclosed systems and methods allows for the creation and maintenance of portfolios of option strategies that may be evaluated together against historical financial data as well as current financial data. Creating a portfolio of option investments allows a user to concentrate on particular set of option investments. A user may create a portfolio by selecting particular option investments from a list of results such as is shown in FIG. 8. After a particular option investment, such as, for example, a particular covered call, is selected, a request is made to create a portfolio. The request is received at server 100 which updates a database to identify the creation of a new portfolio and the specific option investment that is contained in the portfolio.

The user may thereafter call up the particular portfolio by making a request to server 100. Server 100 responds with information identifying the set of option investments specified in the portfolio. The user may proceed to add additional option investments to the portfolio, with the changes being stored at server 100.

Once a portfolio has been defined, the user may select to view the value of a portfolio of option investments at a particular period in the past. These queries are run against the historical data stored at server 100 as described above in connection with FIGS. 8 through 11. The features described in connection with FIGS. 8 through 11 likewise apply to analysis of portfolios of option strategies. For example, the capability to change the period over which to perform an analysis, by changing the beginning date and end date, applies to portfolios as well.

Referring back to FIG. 6, a user of the system, after receiving the results of search, may modify their search criteria in order to identify and consider the impact various changes in search criteria have upon the search results. Indeed, users may repeatedly run searches to test search criteria and investment strategies against actual data during particular market conditions. Once a user has developed a set of search criteria that he or she finds useful, they may save the search criteria for use at a later time. The user may then retrieve the saved search criteria in the future. In an exemplary embodiment, the user may run a saved set of search criteria against current market data to identify existing option investment opportunities. The financial market data may reflect current market conditions and parameters derived from the financial market that reflect existing market conditions.

Thus, exemplary systems and methods for searching historical market data and values for searchable parameters have been disclosed. The disclosed systems and methods allow users to test their option search criteria and investment strategies against actual data from the past. Thus, a user may optimize their search criteria using actual market data from the past, and then apply their optimized search criteria and strategies to locate existing option investment opportunities.

Those skilled in the art understand that computer readable instructions for performing the above described processes and presenting the above described screens, such as those described with reference to FIGS. 7 through 11, can be generated and stored on a computer readable medium such as a magnetic disk or CD-ROM. Further, a computer such as that described with reference to FIG. 2 may be arranged with other similarly equipped computers in a network, and each computer may be loaded with computer readable instructions for performing the above described processes.

While the systems and methods have been described and illustrated with reference to specific embodiments, those skilled in the art will recognize that modification and variations may be made without departing from the principles of the exemplary embodiments as described above and set forth in the following claims. The disclosed systems and methods could be applied to gather and make accessible for searching option strategies relating to any financial instrument or investment opportunity. As an example, the above description is for a covered call buying strategy, but it could also be used for an option or stock selling strategy. The systems and methods could also be applied to option spreads, butterflies, or other stock/option strategies. Still further the disclosed systems and methods may be used to search across multiple different types of option strategies, e.g. long call, naked put, covered call, spreads, collars, etc., for the option strategies offering the most desirable return. Accordingly, reference should be made to the appended claims as indicating the scope of the potential embodiments.

What is claimed:

1. A method implemented in a computing environment for testing searches for identifying option investments using historical data comprising:

creating at a computer a repository of historical option data, said historical option data comprising financial market data received from at least one data source and values derived from said financial market data for a set of searchable option parameters, the financial data and values derived from the financial market data reflecting market conditions on each of a plurality of days in the past;

receiving at a computer user defined search criteria for performing a search for option investments using the repository of historical option data, the user defined search criteria specifying an option strategy type defining a type of option investment that the search is intended to identify, identifying values for a plurality of the set of searchable option parameters defining characteristics for an option investment that the search is intended to identify, and specifying that the search be performed under market conditions as existed at a particular date in the past;

searching at a computer the repository of historical option data for option investments satisfying the user defined search criteria; and transmitting a list of option investments satisfying the user defined search criteria, the list comprising option investments of the identified type and having the defined characteristics.

2. The method of claim 1, wherein the user defined search criteria identifying values for a plurality of the set of searchable option parameters comprises an input selecting a saved set of search criteria.

3. The method of claim 1, wherein the user defined search criteria specifying an option strategy type comprises at least one of the following: covered call, covered put, naked call, naked put, bull put spread, bear call spread, strangle spread, straddle spread, calendar spread, collar spread, and butterfly spread.

4. The method of claim 1, wherein searching for option investments comprises calculating returns for option investments.

5. The method of claim 1, wherein searching for option investments comprises calculating returns for a group of option investments.

6. The method of claim 1, wherein searching for option investments comprises calculating returns for an individual option investment.

7. The method of claim 1, further comprising:

receiving at a computer modified user defined search criteria for searching the repository of historical option data for option investments;

searching at a computer the repository of historical option data for option investments satisfying the modified user defined search criteria;

forwarding a list of option investments satisfying the modified user defined search criteria.

8. The method of claim 1, further comprising:

receiving an input requesting to save the user defined search criteria;

saving the user defined search criteria.

9. The method of claim 8, further comprising:

receiving a request to search current market data using the saved user defined search criteria, said current market data comprising financial market data received from at least one data source and values derived from said financial market data for a set of searchable option parameters, the financial data and values derived from the financial market data reflecting existing market conditions.

10. The method of claim 1, further comprising receiving a request for additional information regarding at least one of an option investment on the transmitted list of option investments satisfying the user defined search criteria.

11. The method of claim 10, wherein receiving a request for additional information comprises receiving a request for an analysis of a particular option investment over time.

12. The method of claim 11, wherein receiving a request for an analysis of a particular option investment over time comprises receiving a request for an analysis of a particular option investment from a search date until at least one of an option expiration date and a date the request is received.

13. The method of claim 1, further comprising receiving a request for additional information regarding a plurality of the option investments on the transmitted list of option investments satisfying the user defined search criteria.

14. The method of claim 13, further comprising transmitting a list identifying for each of the plurality of option investments a value for the option investment at a date in the past corresponding to the user search criteria and a value for the option investment on at least one of an option expiration date and a current date.

15. The method of claim 4, wherein the user defined search criteria specifying an option strategy type specifies a covered call or a covered put, and calculating returns for option investments comprises calculating a percentage if assigned and the percentage if not assigned.

16. The method of claim 4, wherein the user defined search criteria specifying an option strategy type specifies a naked call or a naked put, and calculating returns for option investments comprises calculating a percentage naked return.

17. The method of claim 4, wherein the user defined search criteria specifying an option strategy type specifies an option spread, and calculating returns for option investments comprises calculating a maximum profit realized from the option spread as a percentage of margin requirement.

18. The method of claim 1, further comprising calculating returns for option investments on an option expiration date.

19. The method of claim 1, further comprising calculating a maximum return between a scan date and an option expiration date.

20. The method of claim 1, further comprising calculating a minimum return between a scan date and an option expiration date.

21. The method of claim 1, further comprising calculating returns as a function of time.

22. The method of claim 1, further comprising transmitting a depiction of percentage return of an option investment as a function of time.

23. The method of claim 1, further comprising transmitting a depiction of a price of an option over time and a depiction of a price of an underlying stock over time.

24. A tangible non-transitory computer readable medium having instructions stored thereon that cause a computing system executing the instructions to perform operations comprising:
maintaining in a computing system a database of historical option data, said historical option data comprising financial market data received from at least one data source and values derived from said financial market data for a set of searchable option parameters, the financial data and values derived from the financial market data reflecting market conditions on each of a plurality of days in the past;
receiving at a computing system user defined search criteria for performing a search for option investments using the database of historical option data, the user defined search criteria specifying an option strategy type defining a type of option investment that the search is intended to identify, specifying a saved set of values for a plurality of the set of searchable option parameters defining characteristics for an option investment that the search is intended to identify, and specifying that the search for option investments be performed under market conditions as existed on a particular date in the past;
transmitting a list of option investments satisfying the user defined search criteria, the list comprising option investments of the identified type and having the defined characteristics; and
receiving a request to employ the user defined search criteria to search a database of current market option data.

25. The computer readable medium of claim 24, further comprising receiving a request to save the user defined search criteria.

26. The computer readable medium of claim 24, wherein a receiving request to employ the user defined search criteria to search a database of current market option data comprises receiving a request to search current market data comprising financial market data received from at least one data source and values derived from said financial market data for a set of searchable option parameters, the financial data and values derived from the financial market data reflecting existing market conditions.

27. A system for testing searches for identifying option investments using historical data comprising:
a database of historical option data, said historical option data comprising financial market data received from at least one data source and values derived from said financial market data for a set of searchable option parameters, the financial data and values derived from the financial market data reflecting market conditions on each of a plurality of days in the past;
a computing processor; and
computing memory comprising instructions executable on the computing processor, said instructions comprising:
instructions for receiving user defined search criteria for performing a search for option investments using the repository of historical option data, the user defined search criteria specifying an option strategy type defining a type of option investment that the search is intended to identify, identifying values for a plurality of the set of searchable option parameters defining characteristics for an option investment that the search is intended to identify, and specifying that the search for option investments be performed under market conditions as existed on a particular date in the past;
instructions for searching the database of historical option data for option investments satisfying the user defined search criteria; and
instructions for transmitting a list of option investments satisfying the user defined search criteria, the list comprising option investments of the identified type and having the defined characteristics.

28. The system of claim 27, wherein said instructions for receiving a user defined search criteria comprises receiving an indication of a period of time in the past for which a search is to be made.

29. The system of claim 27, further comprising instructions for receiving a request to search current market data using the saved user defined search criteria, said current market data comprising financial market data received from at least one data source and values derived from said financial market data for a set of searchable option parameters, the financial data and values derived from the financial market data reflecting existing market conditions.

* * * * *